United States Patent Office 3,162,614
Patented Dec. 22, 1964

3,162,614
PROCESS FOR MAKING BENZENE-SOLUBLE
PHENYL SILSESQUIOXANE
Arthur Katchman, Schenectady, N.Y., assignor to General
Electric Company, a corporation of New York
No Drawing. Filed Feb. 23, 1962, Ser. No. 175,287
4 Claims. (Cl. 260—46.5)

This invention is concerned with a process for making organopolysiloxanes. More particularly the invention relates to a process for making a benzene-soluble phenyl silsesquioxane having an intrinsic viscosity in benzene at 25° C. of at least 0.4 deciliter per gram which comprises (1) heating octaphenylsilsesquioxane [hereinafter referred to as $T_8$ and having the formula $(C_6H_5SiO_{3/2})_8$] with an alkaline rearrangement and condensation catalyst (hereinafter referred to as "alkaline catalyst"), until a phenylpolysiloxane prepolymer having an intrinsic viscosity of below 0.4 is obtained, (2) separating the low molecular weight phenylsiloxane prepolymer thus obtained, and (3) heating the (preferably though not essentially) isolated phenylpolysiloxane prepolymer at elevated temperatures in the presence of an alkaline catalyst for a time sufficient to give the abovementioned benzene-soluble phenyl silsesquioxane.

In U.S. Patent 3,017,386, issued January 16, 1962, in the names of John F. Brown, Jr., and Lester H. Vogt, there are disclosed and claimed benzene-soluble phenyl silsequioxanes which have unusual heat resistance at elevated temperatures and yet are soluble in solvents such as benzene. These phenyl silsesquioxanes are obtained by heating a low intrinsic viscosity prepolymer, for instance, that obtained by hydrolyzing phenyltrichlorosilane, with an alkaline rearrangement and condensation catalyst, such as potassium hydroxide, until an intrinsic viscosity of 0.4 or higher is obtained. The latter product after isolation is found to have a thermal resistance greatly in excess of that which might be predicted, and although the final product is substantially infusible at elevated temperatures, it is nevertheless soluble in a large number of solvents particularly benzene.

Although the phenyl silsesquioxanes described and claimed in the above-identified Brown and Vogt patent have the above unusual properties, some difficulty has been encountered in preventing degradation of the phenyl silsesquioxanes at temperatures of the order of 300° C. particularly after long periods of times at these temperatures. Thus, it has been found that the intrinsic viscosity of a phenyl silsesquioxane polymer after about 200 hours at 300° C., suffers a material drop in intrinsic viscosity, and in some instances the intrinsic viscosity after such heat aging will be less than 50 percent of the initial intrinsic viscosity. Although the cause for this degradation is not clearly understood, it may be due to some impurity in the phenyl silsesquioxane, or it may be due to the internal structure of the molecule resulting from the method of preparation which after long periods of time at the elevated temperatures undergoes change.

Unexpectedly, I have discovered that I am able to obtain a phenyl silsesquioxane of increased thermal stability even after long periods of time at temperatures of around 300° C., without any significant change in intrinsic viscosity from the initial intrinsic viscosity of the phenyl silsesquioxane (hereinafter referred to as "silsesquioxane") if the prepolymer used to make the silsesquioxane is made from octaphenylsilsesquioxane and this prepolymer is thereafter subjected to heating at elevated temperatures in the presence of an alkaline catalyst. By starting with the $T_8$ composition, I have been able to heat the phenyl silsesquioxane composition over 200 hours at 300° C. with only slight variation in intrinsic viscosity from the initial intrinsic viscosity of the phenyl silsesquioxane.

The octaphenylsilsesquioxane employed in the practice of the present invention may be made in various ways. One method comprises hydrolysizing phenyltrichlorosilane in a large amount of solvent, for instance, benzene, and mixing the solution with sufficient water to effect hydrolysis of all the silicon-bonded chlorine atoms. Thereafter, the hydrolysis product free of water, but dissolved in the solvent, is mixed with an alkaline catalyst, such as potassium hydroxide, and heated, advantageously at the reflux temperature of the mass, for a length of time sufficient to effect rearrangement to the octaphenylsilsesquioxane stage. The mass is then allowed to cool and remain for a sufficient length of time to allow the crystalline $T_8$ to settle out. Improvements in yields of $T_8$ can be obtained by again heating the non-precipitated material in the solvent for an additional length of time and thereafter the product can be cooled and the crystalline octaphenylsilsesquioxane isolated by filtration. More complete directions for preparing the octaphenylsilsesquioxane can be found in U.S. Patent 3,000,858, issued September 19, 1961, assigned to General Electric Company.

The conversion of the preferably isolated octaphenylsilsesquioxane to the low intrinsic viscosity state (i.e., the intrinsic viscosity below 0.4) state can be accomplished by heating the $T_8$ in a suitable solvent such as a polar solvent for example chlorobenzene, orthochlorobenzene, chlorinated diphenyl, etc. This heating is conducted in the presence of an alkaline catalyst, which may be present in a catalytic amount ranging from about 0.001 to 2 percent, by weight, based on the weight of the $T_8$. Among such catalysts may be mentioned the alkaline-metal hydroxides (e.g., potassium hydroxide, cesium hydroxide, rubidium hydroxide, etc.), quaternary ammonium compounds (e.g., tetramethyl ammonium hydroxide, tetrabutyl ammonium hydroxide, trimethyl ammonium butoxide, etc.), tetraorganophosphonium compounds (e.g., tetrabutyl phosphonium hydroxide, tetraethyl phosphonium hydroxide, etc.), alkali metal silanolates (e.g., the potassium salt of methylsilanetriol, the potassium salt of phenylsilanetriol, either alone or in the form of an alcoholate, for instance, as a methanol solution, etc.), etc.

The prepolymer obtained by heating the $T_8$ with the alkaline catalyst will generally have an intrinsic viscosity ranging from about 0.01 to about 0.35. The prepolymer thus obtained is advantageously isolated by adding to the solution of the prepolymer (in which the reaction of the $T_8$ has taken place) a solvent (e.g., methanol) which will cause precipitation of the prepolymer. The prepolymer is then preferably isolated, purified and vacuum-dried. Thereafter, the prepolymer is incorporated in a solvent (e.g. an aromatic hydrocarbon solvent) which is substantially inert to the prepolymer, the alkaline catalyst (which is advantageously present in the same weight as the amounts previously stated for converting the $T_8$ to the prepolymer stage), and to the final silsesquioxane. Among the solvents which may be employed in the final conversion of the octaphenylsilsesquioxane-derived prepolymer to the benzene-soluble phenyl silsesquioxane may be mentioned, for instance, diphenyl, diphenyl oxide, mixtures of the latter two ingredients (e.g., Dowtherm A sold by Dow Chemical Company, Midland, Michigan), methyl phenyl ether, ethyl phenyl ether, cyclohexane, benzonitrile, mesitylene, durene, metadimethoxybenzene, benzene, toluene, etc.

The temperature at which the $T_8$ is converted to the prepolymer may be varied widely. Generally, I may employ temperatures of from about 100–300° C. and advantageously within the range of from about 150°–250° C., depending on the solvent used and whether atmospheric or super-atmospheric pressure is employed. Temperatures at which the prepolymer is converted to the finally desired phenyl silsesquioxane of intrinsic viscosity of 0.4 or higher are generally higher than the temperatures used to make the prepolymer and advantageously are within the range of from about 200–325° C. Somewhat lower temperatures can be used in making the final higher intrinsic viscosity compositions provided super-pressures are employed. The times of heating either the $T_8$ to convert it to the prepolymer or the conversion of the prepolymer to the phenyl silsesquioxane state can be varied widely, preferably until equilibrium conditions are attained. Generally, in each instance, the time of heating is satisfactorily accomplished within the time limits of from 1 to 10 hours or more.

Although I do not wish to be restricted to any theoretical consideration, it is believed that the phenyl silsesquioxanes obtained in accordance with the practice of my invention are generally of a linear nature which would account for their soluble characteristics. Based on information derived from studies of these polymers, particularly infrared data, it is believed that the polymers may be composed of a large number of linearly arranged siloxy units of the formula

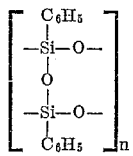

where $n$ is a whole number greater than 50 and may be as high as several hundred to several thousand or more.

The intrinsic viscosity referred to above (identified by the symbol "$|\eta|$" or "$\eta$") as a measurement of the molecular weight of the benzene-soluble silsesquioxane (or of the prepolymer) was determined as follows. The viscometer used was a modified Ubbelohde viscometer in which in place of the straight capillary tube between the second bulb and the reservoir, a coil of two turns of capillary tubing was substituted. The dimensions of the capillaries were (a) 2 mm. diameter between first and second bulbs and (b) 0.5 mm. diameter for coiled capillary (inside diameter of coils about 1"). The intrinsic viscosity was carried out in a constant temperature water bath maintained at about 25° C.

The actual determination of the intrinsic viscosity involved drying of 0.1 gram of the polymer whose intrinsic viscosity was to be determined, in vacuum at 110° C. for three hours and then weighing the sample. A volume (in milliliters) of reagent grade benzene was added equal to the weight of the polymer (in grams) multiplied by 100. When all the polymer had dissolved, a small test tube was filled with the solution, corked and centrifuged to settle out any foreign matter that might be present. A 5 ml. aliquot was removed from the test tube and transferred to the viscometer placed in a 25° C. constant temperature water bath. The bulbs of the viscometer were filled with the solution and the time in seconds for the solution to fall from the first to the second graduation was recorded. Several dilutions were made by adding known volumes of benzene to the reservoir bulb, mixing thoroughly, and then repeating the procedure. The number of seconds required for the solvent to pass through the first and second graduations was checked periodically. The intrinsic viscosity was determined by plotting the specific viscosity divided by the concentration against the concentration in grams of polymer per hundred ml. of benzene and extrapolating the curve to C (concentration) equal to 0. The following are the formulas which were used in determining the intrinsic viscosity:

$$\eta \text{ relative} = \frac{\text{number of seconds for solution}}{\text{number of seconds for solvent}}$$

$$\eta \text{ specific} = \eta \text{ relative} - 1$$

$$\frac{\eta \text{ specific}}{C} = \frac{\eta \text{ specific}}{\text{grams polymer per 100 ml. solvent}}$$

$$|\eta|(\text{intrinsic}) = \frac{\eta \text{ specific}}{C} \text{ as } C \to 0$$

In order that those skilled in the art may better understand how the present invention may be practiced, the following examples are given by way of illustration and not by way of limitation. All parts and percents are by weight.

EXAMPLE 1

This example illustrates the preparation of octaphenylsilsesquioxane having the formula $$(C_6H_5SiO_{3/2})_8$$

more particularly, 106.5 grams of phenyltrichlorosilane (0.5 mol) was dissolved in 500 ml. benzene and shaken with water until hydrolysis was complete. After washing the hydrolysis product with water, 16.6 ml. commercial 30 percent benzyltrimethylammonium hydroxide solution (0.03 mol) was added and the mixture heated at the reflux temperature of the mass for 4 hours. The mass was then allowed to cool and remain for about 96 hours, at the end of which time, the slurry obtained was again heated at the reflux temperature of the mass for another 24 hours and then cooled and filtered. This yielded about 57 grams of octaphenylsilsesquioxane of the above formula.

EXAMPLE 2

This example illustrates the preparation of a phenyl prepolymer using the procedure described in the above-described Brown and Vogt patent. About 500 parts phenyltrichlorosilane, dissolved in 500 parts toluene were added slowly with stirring to 2000 parts water. The acid layer was separated and the resin layer in the form of a toluene solution was subjected to azeotropic distillation to remove residual water and HCl. Thereafter about 0.078 percent, by weight, KOH based on the weight of the calculated hydroxyl-free phenylpolysiloxane, was added and the toluene solution was refluxed with stirring for about 9 hours to give a silanol-free phenyl polysiloxane prepolymer. The resulting syrupy phenyl polysiloxane prepolymer comprising about 50.3 percent, by weight, of the toluene solution was composed of recurring units of the formula $$C_6H_5SiO_{1.5}$$

Separation of the solid phenyl prepolymer was accomplished by diluting the toluene solution of the phenylpolysiloxane prepolymer with about 1.5 times its weight mineral spirits (Stoddard solvent boiling approximately within the range of 156–196° C., approximate K.B. value 37). The resultant slurry was agitated strongly for about 10 minutes and then filtered, giving a solid product which was air-dried for about 16 hours and then for 4 hours at 150° C.

EXAMPLE 3

Into a reaction vessel were placed 20 parts octaphenylsilsesquioxane prepared above, 261 parts o-dichlorobenzene, and 0.01 part potassium hydroxide. The mixture was heated for about 1 hour at the reflux temperature of the mass (about 180–190° C.) until a homogeneous solution was obtained. The solution was cooled to room temperature and the phenylpolysiloxane prepolymer was precipitated by adding about 1000 parts n-hexane to the solution. The precipitated product was removed by filtration, and vacuum-dried giving almost a quantitative yield of a white solid phenylpolysiloxane prepolymer having an intrinsic viscosity somewhat below 0.05 deciliter per gram. About 5 parts of this prepolymer which contained about 0.03 percent potassium hydroxide, was polymerized by dissolving it in a solvent comprising 2.5 parts diphenyl and 2.5 parts benzene and then heating the solution at a temperature of about 100-125° C. to volatilize most of the benzene, and thereafter the mixture of the remaining solvent and prepolymer was heated under precautions observed to prevent further solvent loss (by covering the apparatus) at a temperature of about 250° C. for about 2 hours. No additional alkaline catalyst was added because advantage was taken of the residual potassium hydroxide present from the conversion of the $T_8$ to the prepolymer stage. The finally polymerized phenyl silsesquioxane polymer was dissolved in about 10 volumes benzene per volume reaction mixture, and sufficient glacial acetic acid was added to neutralize the potassium hydroxide. The polymer was precipitated by adding methanol, and then dried under vacuum to give a phenyl silsesquioxane polymer having an intrinsic viscosity of 1.08 deciliters per gram. A film of this material was prepared by making a 5 weight percent solution of the polymer in an equal weight mixture of benzene and chloroform. A thin film was cast on a glass plate, solvent evaporated, and the film formed, which was about one mil thick, was vacuum-dried at 150° C. for 30 minutes.

EXAMPLE 4

A polymer was prepared from the phenylpolysiloxane prepolymer of Example 2 employing the same procedure, ingredients, and proportion of ingredients as used in Example 3 with the exception that the starting prepolymer of Example 2 was used in place of the $T_8$-derived prepolymer of Example 3. Additional directions for preparing phenyl silsesquioxane polymers from such prepolymers are found disclosed and claimed in the above-mentioned Brown and Vogt patent. The polymer thus obtained was found to have an intrinsic viscosity in benzene of 1.05 deciliters per gram at 25° C. The phenyl silsesquioxane polymer prepared in the above fashion was then made into a film in the same manner as was done in Example 3.

EXAMPLE 5

The film of Examples 3 and 4 were then tested for tensile strength, percent elongation, and heat-aging characteristics by heating the films at 300° C. for varying lengths of time in a 30 percent relative humidity. The following Table I shows the tensile strength and percent elongation of each of the films at room temperature, as well as the heat-aging characteristics of the films with varying times at 300° C.

Table I

|  | Example 3 Film | | Example 4 Film | |
|---|---|---|---|---|
| Tensile, p.s.i. | 4,470 | | 3,437 | |
| Percent Elongation | 5-10 | | 16 | |
|  | Hours | Dl./g. | Hours | Dl./g. |
| Intrinsic Viscosity after heat-aging at 300° C | 24 | 1.12 | 24 | |
|  | 48 | 0.99 | 116 | 0.99 |
|  | 216 | 0.98 | 216 | 0.36 |

It will of course be apparent to those skilled in the art that in addition to the solvents, conditions, and alkaline catalyst employed above, other solvents, conditions, and catalysts can be used, many examples of which have been given above, without departing from the scope of the invention. The solvent used both for converting the octaphenylsilsesquioxane to the prepolymer stage and the conversion of the prepolymer to the final phenyl silsesquioxane state may be the same or different. Generally, lower boiling solvents (i.e., boiling below 150° C.) are advantageously used in the reaction involved in the conversion of the octaphenylsilsesquioxane to the prepolymer stage, and higher boiling solvents (above 150° C.) are advantageously employed in the conversion to the final phenyl silsesquioxane stage. Similarly variations in intrinsic viscosity can also be realized by varying the concentration of solvent or solvents in the condensed phase with the prepolymer at the time of conversion to the finally polymerized state. Thus, such changes in intrinsic viscosity are realized by varying the concentrations of the solvent whereby smaller weight ratios of the polymerizing solvent to the prepolymer (in the final conversion step) give higher intrinsic viscosities. Advantage can be taken of varying the concentration of the solvent in accordance with the invention disclosed and claimed in the copending Katchman et al. application Serial No. 175,286, filed concurrently herewith, and assigned to the same assignee as the present invention.

The compositions prepared in accordance with the process of the present invention have many uses. These compositions may be dissolved in solvents (in solids concentrations of from about 0.5 to 50 weight percent), for instance, benzene, and used to coat metallic conductors, to provide heat-resistant insulation possessing good electrical properties. Alternatively, solutions of these organopolysiloxanes can be cast on flat surfaces and the solvent evaporated to yield cohesive films which exhibit unusual heat resistance. These films can be used for many high-temperature applications, for example, as slot liners and as end turn winding insulation in motors. Solutions of these compositions may be applied to various textiles, particularly inorganic fibrous materials, to render the latter heat-resistant when the solvent is removed. Solutions of the formed organopolysiloxane compositions can be applied to adjacent surfaces, the treated surfaces pressed together, and heated to volatilize the solvent and to form a strong, heat resistant bond between the adhered surfaces. Various fillers may be added to the compositions of intrinsic viscosity of 0.4 or higher, for instance, finely divided silicas, carbon black, titanium dioxide, iron oxide, metallic pigments, etc. which can be used for dipping or coating applications.

The incorporation of suitable plasticizers such as, for instance, high temperature solvents for the heat equilibrated composition, in amounts ranging from about 1 to 25 percent, by weight, of the total mass, is not precluded. Various dyes and pigments may also be used where applications recommend the incorporation of such materials.

High temperature laminates may be prepared by dipping various organic and preferably inorganic porous materials such as glass wool, glass cloth, asbestos cloth, polyethylene terephthalate film, etc., in solutions of the compositions, layers of the coated and/or impregnated materials superposed upon each other and pressed at elevated temperatures of the order of about 200 to 350° C. at pressures ranging, for instance, from about 5 to 5,000 p.s.i. Such laminates may be in the form of panels used for electrical insulation, insulating (e.g., asbestos) tapes, etc., and may also be formed and used as nose cones for rockets and other projectiles which are subjected to high temperatures at supersonic speeds.

What I claim as new and desire to secure by Letters Patent of the United States is:

1. The process for making a benzene-soluble phenyl silsesquioxane having an intrinsic viscosity in benzene of at least 0.4 deciliter per gram when measured at 25° C. when comprises (1) heating preformed octaphenylsilsesquioxane with an alkaline rearrangement and condensation catalyst until a phenylpolysiloxane prepolymer having an intrinsic viscosity of from about 0.01 to 0.35 is obtained, (2) isolating the phenylpolysiloxane prepolymer, and (3) heating the formed phenylpolysiloxane prepolymer at elevated temperatures in a solvent for the prepolymer in the presence of an alkaline rearrangement and condensation catalyst for a time sufficient to give the above-mentioned benzene-soluble phenyl silsesquioxane.

2. The process as in claim 1 in which the alkaline condensation and rearrangement catalyst is potassium hydroxide.

3. The process as in claim 1 in which the solvent is o-dichlorobenzene.

4. The process for making a benzene-soluble phenyl silsesquioxane having an intrinsic viscosity in benzene of at least 0.4 deciliter per gram when measured at 25° C. which comprises (1) forming a phenylpolysiloxane prepolymer from preformed octaphenylsilsesquioxane by heating the latter with an alkaline rearrangement and condensation catalyst until a prepolymer having an intrinsic viscosity of from 0.01 to 0.35 is obtained, (2) separating the phenylpolysiloxane prepolymer from the medium in which it was formed, and (3) heating the isolated phenylpolysiloxane prepolymer at a temperature of from 200–325° C. in the presence of an aromatic solvent selected from the class consisting of chlorobenzene, chlorinated diphenyl, diphenyl, diphenyl oxide, methyl phenyl ether, ethyl phenyl ether, benzonitrile, mesitylene, durene, meta-dimethoxybenzene, benzene, and toluene, and catalytic amounts of an alkaline rearrangement and condensation catalyst for a time sufficient to give the above-mentioned benzene-soluble phenylpolysiloxane having an intrinsic viscosity of at least 0.4.

References Cited by the Examiner
UNITED STATES PATENTS

| | | | |
|---|---|---|---|
| 3,000,858 | 9/61 | Brown | 260—46.5 |
| 3,017,385 | 1/62 | Sprung et al. | 260—46.5 |
| 3,017,386 | 1/62 | Brown et al. | 260—46.5 |

MURRAY TILLMAN, *Primary Examiner.*

WILLIAM H. SHORT, *Examiner.*